United States Patent
Weon et al.

(10) Patent No.: US 12,514,029 B2
(45) Date of Patent: Dec. 30, 2025

(54) PART INCLUDING SILICON CARBIDE LAYER AND MANUFACTURING METHOD THEREOF

(71) Applicant: KNJ CO., LTD, Asan-si (KR)

(72) Inventors: Jong-hwa Weon, Cheonan-si (KR); Bun-hei Koo, Seoul (KR); In-su Hwang, Incheon (KR); Nam-ju Kim, Cheonan-si (KR); Myung-jin Ko, Daejeon (KR); Ji-hoon Lee, Dangjin-si (KR); Hyeon-jun Cho, Cheongju-si (KR)

(73) Assignee: KNJ CO., LTD, Asan-si (KR)

( * ) Notice: Subject to any disclaimer, the term of this patent is extended or adjusted under 35 U.S.C. 154(b) by 720 days.

(21) Appl. No.: 17/760,078

(22) PCT Filed: Jan. 28, 2021

(86) PCT No.: PCT/KR2021/001142
§ 371 (c)(1),
(2) Date: Aug. 3, 2022

(87) PCT Pub. No.: WO2021/157953
PCT Pub. Date: Aug. 12, 2021

(65) Prior Publication Data
US 2023/0068125 A1    Mar. 2, 2023

(30) Foreign Application Priority Data

Feb. 4, 2020    (KR) .................. 10-2020-0013166

(51) Int. Cl.
| | | |
|---|---|---|
| H10H 20/01 | (2025.01) | |
| C04B 35/52 | (2006.01) | |
| C04B 41/50 | (2006.01) | |

(52) U.S. Cl.
CPC ......... H10H 20/014 (2025.01); C04B 35/522 (2013.01); C04B 41/5059 (2013.01)

(58) Field of Classification Search
CPC .. C04B 35/522; C04B 41/87; H01L 21/02529
See application file for complete search history.

(56) References Cited

U.S. PATENT DOCUMENTS

| | | | |
|---|---|---|---|
| 2013/0269597 A1* | 10/2013 | Torimi | C30B 29/36 117/63 |
| 2020/0066514 A1* | 2/2020 | Kim | H01L 21/0243 |
| 2021/0328158 A1* | 10/2021 | Kang | H10K 77/111 |

FOREIGN PATENT DOCUMENTS

| | | |
|---|---|---|
| JP | 10-195655 A | 7/1998 |
| JP | 2015-46536 A | 3/2015 |

(Continued)

OTHER PUBLICATIONS

International Search Report dated May 20, 2021 in International Application No. PCT/KR2021/001142.

*Primary Examiner* — Nicholas J Tobergte
*Assistant Examiner* — Adin Hrnjic
(74) *Attorney, Agent, or Firm* — SALIWANCHIK, LLOYD & EISENSCHENK

(57) ABSTRACT

The present disclosure relates to a part including silicon carbide layer and manufacturing method thereof, and the manufacturing method according to the present disclosure includes preparing a graphite substrate, and laminating a silicon carbide layer on a surface of the graphite substrate, wherein at the laminating the silicon carbide layer, the silicon carbide layer is laminated such that the thickness of the silicon carbide layer is 0.01 to 1 times the thickness of the graphite substrate, thereby improving the durability of the part including silicon carbide layer.

4 Claims, 5 Drawing Sheets

(56) References Cited

FOREIGN PATENT DOCUMENTS

| KR | 10-2009-0108151 A | 10/2009 |
| KR | 10-1393459 B1 | 5/2014 |
| KR | 10-2018-0071952 A | 6/2018 |

* cited by examiner

PART INCLUDING SILICON CARBIDE LAYER AND MANUFACTURING METHOD THEREOF

CROSS-REFERENCE TO RELATED APPLICATIONS

This application is the U.S. national stage application of International Patent Application No. PCT/KR2021/001142, filed Jan. 28, 2021, which claims the benefit under 35 U.S.C. § 119 of Korean Application No. 10-2020-0013166, filed Feb. 4, 2020, the disclosures of each of which are incorporated herein by reference in their entirety.

FIELD

The present disclosure relates to a part including silicon carbide layer and manufacturing method thereof, and more particularly, to a part including silicon carbide layer with improved durability, and manufacturing method thereof.

BACKGROUND

In general, parts such as wafer carriers used in semiconductor or LED manufacturing processes are made by coating a silicon carbide (SiC) layer of about 100 μm on a graphite substrate.

In such a part that includes a silicon carbide layer, due to the etching and thinning of the silicon carbide layer in the process of cleaning and baking the film applied on the product surface during the semiconductor or LED manufacturing process, when the process is finished, the graphite substrate may be exposed, and if the exposed graphite substrate is etched during the process, the etched graphite may act as an impurity in the manufacturing process.

Therefore, there is a burden that the part that includes a silicon carbide layer used in the semiconductor or LED manufacturing processes has to be replaced frequently before the graphite substrate is exposed.

In order to solve this problem, a part can be composed only with SiC without a graphite substrate, but the manufacturing time is significantly increased compared to the case of using a graphite substrate, and when the part is composed of only SiC, the weight of the part also increases significantly, thus leading to a problem of lack of effectiveness.

DISCLOSURE

Technical Problem

Therefore, a purpose of the present disclosure is to provide a part including silicon carbide layer with improved durability, and manufacturing method thereof.

Another purpose of the present disclosure is to provide a part including silicon carbide layer with increased thickness, and manufacturing method thereof.

Another purpose of the present disclosure is to provide a part including silicon carbide layer with increased thickness but where the manufacturing time is not significantly increased, and manufacturing method thereof.

Another purpose of the present disclosure is to provide a part including silicon carbide layer with increased thickness but where the bonding force with the substrate is not weakened, and manufacturing method thereof.

Technical Solution

The aforementioned and other purposes of the present disclosure can all be achieved by a part including silicon carbide layer, and manufacturing method thereof.

A manufacturing method of a part including silicon carbide layer according to an embodiment of the present disclosure includes preparing a graphite substrate; and laminating a silicon carbide layer on a surface of the graphite substrate, wherein at the laminating the silicon carbide layer, the silicon carbide layer is laminated such that a thickness of the silicon carbide layer is 0.01 to 1 times a thickness of the graphite substrate.

Further, the manufacturing method of a part including silicon carbide layer according to an embodiment of the present disclosure includes preparing a graphite substrate; and laminating a silicon carbide layer on a surface of the graphite substrate, wherein at the laminating the silicon carbide layer, the silicon carbide layer is laminated such that the thickness of the silicon carbide layer is 2 mm to 3 mm.

The laminating the silicon carbide layer may desirably involve laminating the silicon carbide layer at a first deposition rate and then laminating the silicon carbide layer at a second deposition rate that is faster than the first deposition rate.

The first deposition rate may be 5 μm/h or more and 10 μm/h or less, and the second deposition rate may be 30 μm/h or more and 120 μm/h or less, or 50 μm/h or more and 100 μm/h or less.

Further, the laminating the silicon carbide layer may desirably involve adjusting a processing rate to the second processing rate after the silicon carbide layer covers an entirety of an upper surface of the graphite substrate.

Further, the manufacturing method of a part including silicon carbide layer according to an embodiment of the present disclosure may further include surface processing of forming a groove on a surface of the silicon carbide layer.

In a case where a first groove is formed on the surface of the graphite substrate, at the surface processing, the surface of the silicon carbide layer may be processed such that the surface of the silicon carbide layer has a second groove having a position and shape corresponding to the first groove.

Further, the surface processing may include total processing of removing an entirety of the surface of the laminated silicon carbide layer by a certain thickness such that a concave part of the silicon carbide layer laminated on an upper portion of the first groove has a smaller cross-sectional area than the first groove; and partial processing of removing a partial area of the silicon carbide layer such that the concave part remaining after the total processing has a depth and cross-section corresponding to the first groove, to form the second groove.

In a case where there is no groove on the surface of the graphite substrate, at the surface processing, a groove may be formed on the surface of the silicon carbide layer.

A part including silicon carbide layer according to an embodiment of the present disclosure includes a graphite substrate; and a silicon carbide layer laminated on a surface of the graphite substrate, wherein a thickness ratio of a thickness of the graphite substrate and a thickness of the silicon carbide layer is 1:0.01 to 1:1, or the thickness of the silicon carbide layer is 2 mm to 3 mm.

Further, there may be no groove on the surface of the graphite substrate, and there may be a groove on a surface of the silicon carbide layer.

Advantageous Effects

The present disclosure provides an effect of providing a part including silicon carbide layer with increased thickness to improve durability but where the manufacturing time is not significantly increased and the bonding force with the substrate is not weakened, and manufacturing method thereof.

DETAILED DESCRIPTION

Figure 1:
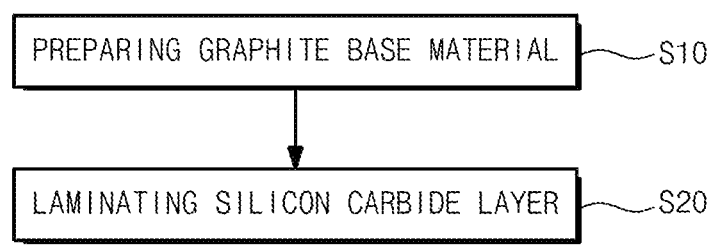
FIG. 1 is a flowchart of a manufacturing method of a part including silicon carbide layer according to an embodiment of the present disclosure.

Hereinbelow, a part including silicon carbide layer and manufacturing method thereof according to the present disclosure will be described in detail with reference to the drawings attached.

In the description below, only those necessary for understanding a part including silicon carbide layer and manufacturing method thereof according to an embodiment of the present disclosure will be described, and description of other parts may be omitted so as not to obscure the gist of the present disclosure.

Further, the terms or words used in the present specification and claims described below should not be construed as being limited to conventional or dictionary meanings, but should be construed as meanings and concepts consistent with the technical spirit of the present disclosure so that the present disclosure can be most appropriately expressed.

Throughout the specification, when it is stated that a part "includes" a certain component, it means that other components may be further included, rather than excluding other components, unless otherwise stated.

In various embodiments, components having the same configuration will be typically described in one embodiment using the same reference numerals, and configurations different from the one embodiment will be described in other embodiments.

FIG. 1 is a flowchart of a method for manufacturing a part including silicon carbide layer according to an embodiment of the present disclosure.

As illustrated in FIG. 1, a method for manufacturing a part including silicon carbide layer according to an embodiment of the present disclosure includes preparing a graphite substrate (S10), and laminating a silicon carbide layer on a surface of the graphite substrate (S20).

Figure 2:
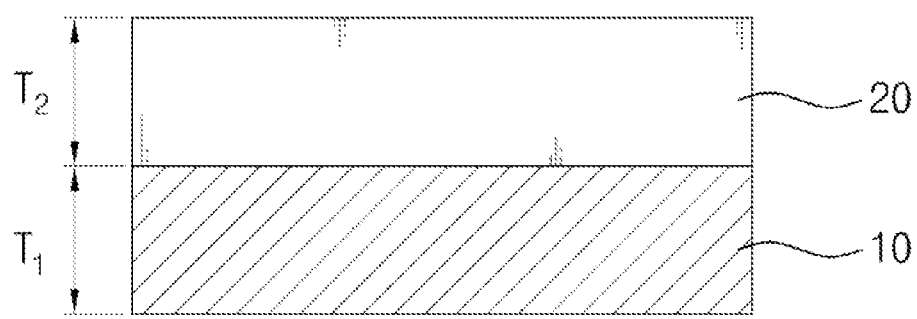
FIG. 2 is a cross-sectional view of a part including silicon carbide layer according to an embodiment of the present disclosure.

The conventional method for manufacturing a part including silicon carbide layer also consists of preparing a graphite substrate and coating silicon carbide on a surface of the graphite substrate, but unlike the conventional manufacturing method, there is a difference that in the manufacturing method of a part including silicon carbide layer according to an embodiment of the present disclosure, as illustrated in FIG. 2, at the laminating step of the silicon carbide layer, the silicon carbide layer is laminated thickly so that the thickness $T_2$ of the silicon carbide layer 20 is 0.01 to 1 times the thickness $T_1$ of the graphite substrate 10.

Figure 3:
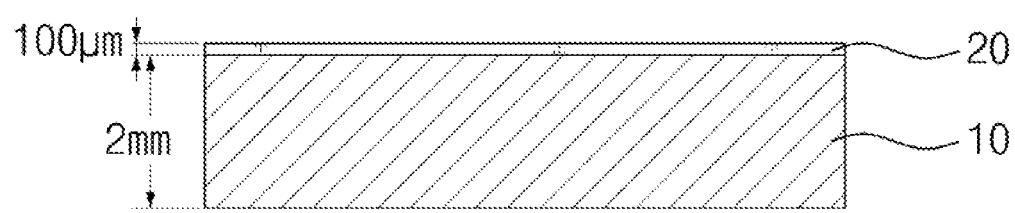
FIG. 3 is a cross-sectional view of a conventional part including silicon carbide layer.

More specifically, in a conventional part including silicon carbide layer, as illustrated in FIG. 3, the silicon carbide layer is generally 100 μm thick, that is, it is coated thinly such that the thickness of the silicon carbide layer is 0.005 times or less the thickness of the graphite substrate, whereas in the part including silicon carbide layer according to an embodiment of the present disclosure, the silicon carbide layer is increased up to 2 mm to 3 mm, so that the thickness of the silicon carbide layer is 0.01 to 1 times the thickness $T_1$ of the graphite substrate 10. Therefore, it is possible to extend the service life by 20 times or more than that of the conventional part including silicon carbide layer.

Here, the thicker the silicon carbide layer the longer the service life of the part, but in actual use environment, as long as the thickness is 2 mm or more, there is no problem in using it, and thus it is inefficient to increase the thickness of the silicon carbide layer to above that level, and further, it is also not desirable due to increase of cost.

Meanwhile, it is conceivable to construct the part only with the silicon carbide layer, but if the entire part is made of the silicon carbide layer without using the graphite substrate, the manufacturing time will be significantly increased, and so it is preferable to use the graphite substrate.

Thus, in the method for manufacturing a part including silicon carbide layer according to an embodiment of the present disclosure, the processing conditions at the step of laminating the silicon carbide layer (temperature, pressure, flow, concentration and the like) are adjusted so that the deposition rate of the silicon carbide layer is increased to 30 μm/h or more and 120 μm/h or less, and preferably, to 50 μm/h or more and 100 μm/h or less, thereby allowing the silicon carbide layer with a desirable thickness to be laminated within a short period of time.

Meanwhile, if the deposition rate of the silicon carbide layer is increased, the grain size of the silicon carbide material forming the silicon carbide layer increases, and thus there is a risk that the silicon carbide may not penetrate properly into the pores of the graphite substrate, which is a porous material. This may weaken the bonding force between the graphite substrate and the silicon carbide layer, leading to a risk that cracks may occur in the surface processing step that will be described below or the silicon carbide layer peeling off.

Therefore, when depositing the silicon carbide layer, at an initial stage, it is desirable to deposit the silicon carbide layer at a first deposition rate that is not so fast, and then after the entirety of the upper surface of the graphite substrate is coated with the silicon carbide, it is desirable to deposit the silicon carbide layer up to the desirable thickness at a second deposition rate that is faster than the first deposition rate.

Here, the first deposition rate may be about 5 μm/h or more and 10 μm/h or less, and the second deposition rate may be about 30 μm/h or more and 120 μm/h or less, but if the deposition process of the silicon carbide layer becomes too long, the problem of the nozzle of the deposition chamber being blocked may occur. Further, increasing the processing rate too much may be a burden to the deposition chamber. Therefore, it is desirable that the second deposition rate is 50 μm/h or more and 100 μm/h or less. Further, in order to adjust the processing rate to the first deposition rate, it is desirable to maintain the deposition temperature to 1200° C. or less, and desirable 1100° C. to 1200° C. Further, in order to adjust the processing rate to the second deposition rate, it is desirable to maintain the deposition temperature at 1300° C. to 1500° C. (more desirably, 1350° C. to 1450° C.).

Figure 4:
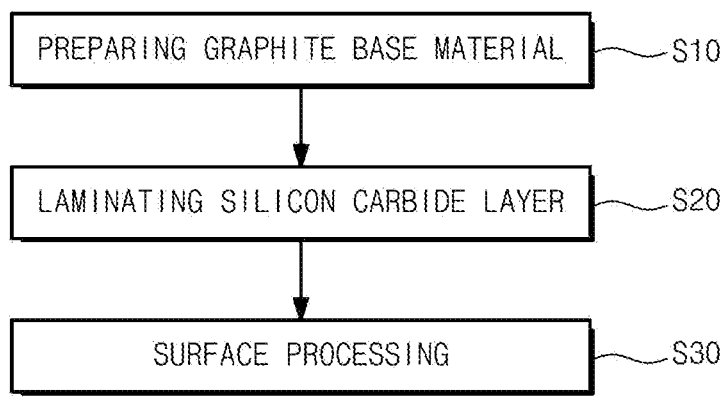
FIG. 4 is a flowchart of a manufacturing method of a part including silicon carbide layer according to another embodiment of the present disclosure.

FIG. 4 illustrates the flowchart of the method for manufacturing a part including silicon carbide layer according to an embodiment of the present disclosure.

As illustrated in FIG. 4, the method for manufacturing a part including silicon carbide layer according to an embodiment of the present disclosure includes preparing a graphite substrate (S10), laminating a silicon carbide layer on a surface of the graphite substrate (S20), and surface processing (S30).

A method for manufacturing a part including silicon carbide layer according to another embodiment of the present disclosure is characterized to further include surface processing (S30) in addition to the method for manufacturing a part including silicon carbide layer according to the one embodiment of the present disclosure.

Figure 5:
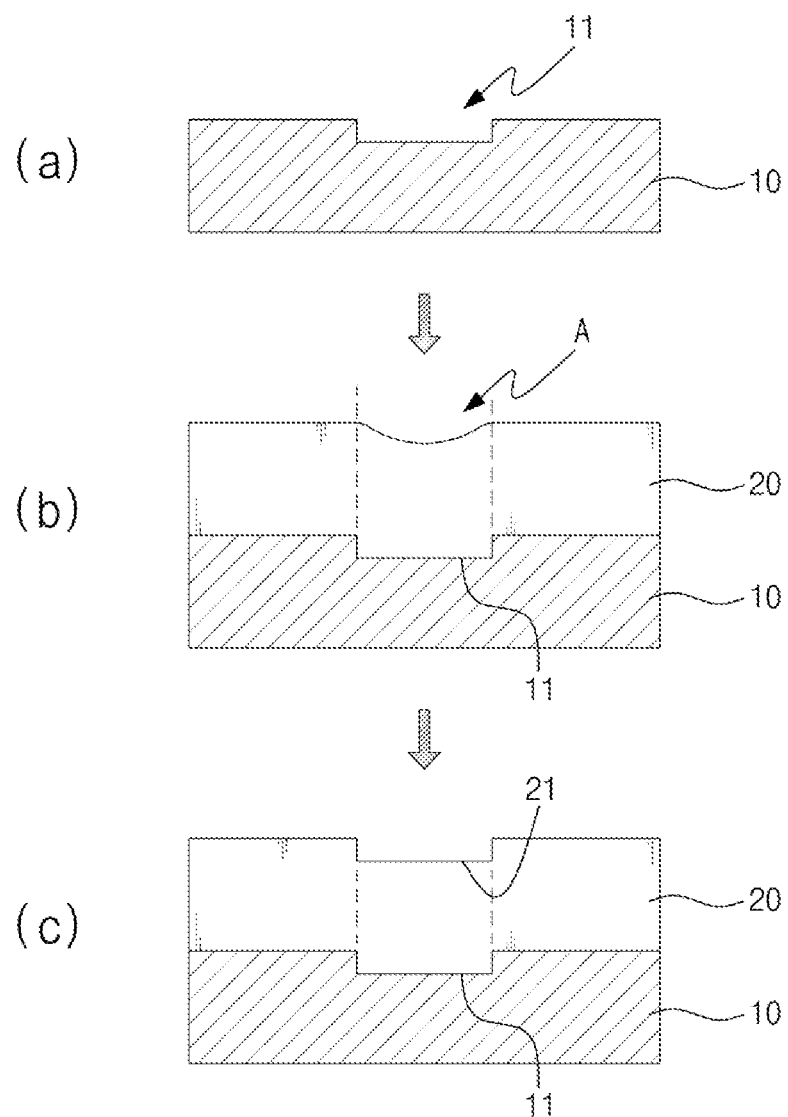
FIGS. 5 and 6 are views sequentially showing cross-section views of a part including silicon carbide layer manufactured according to another embodiment of the present disclosure in a case where a substrate has a groove.
Figure 6:
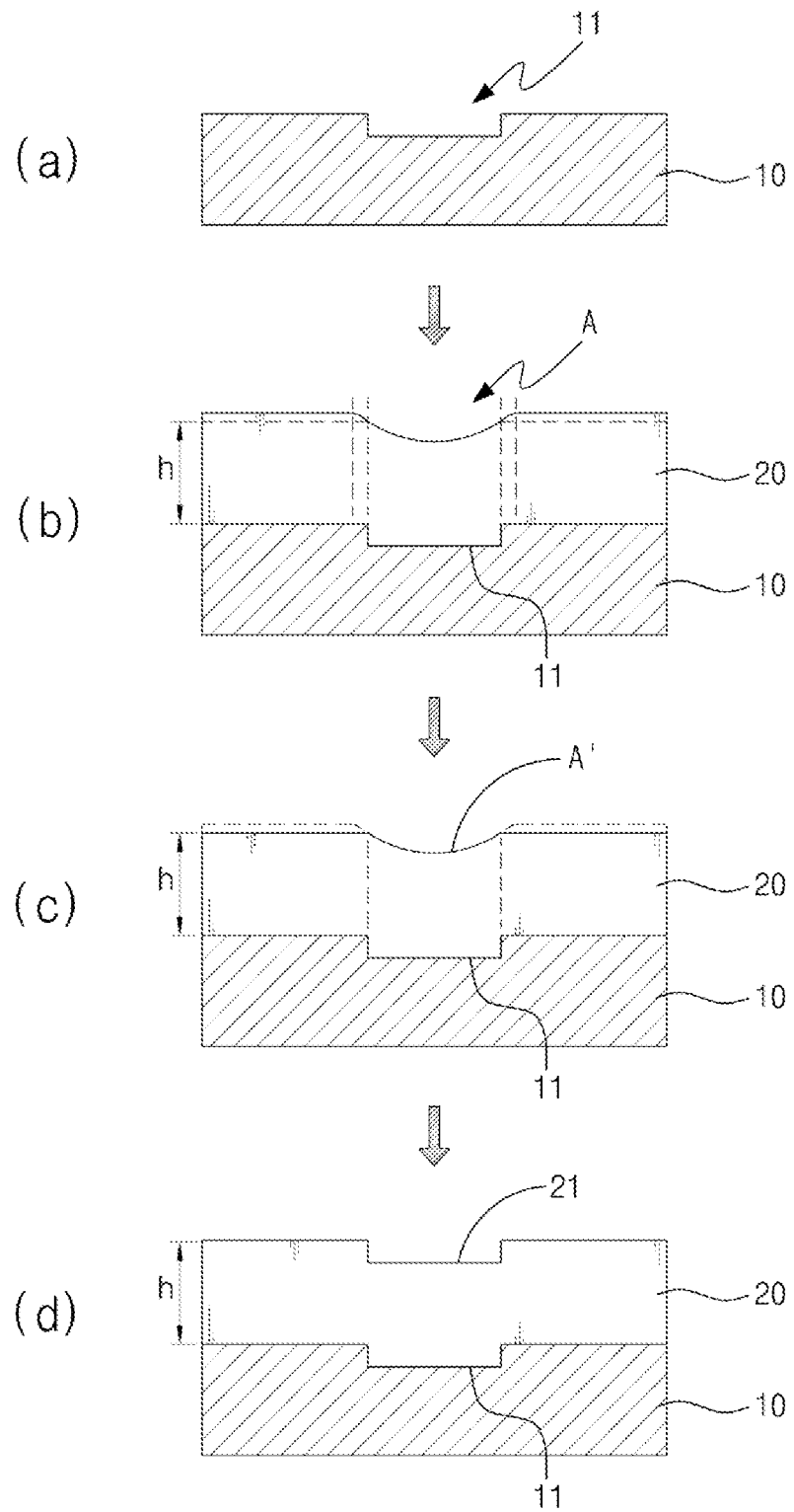
Figure 7:
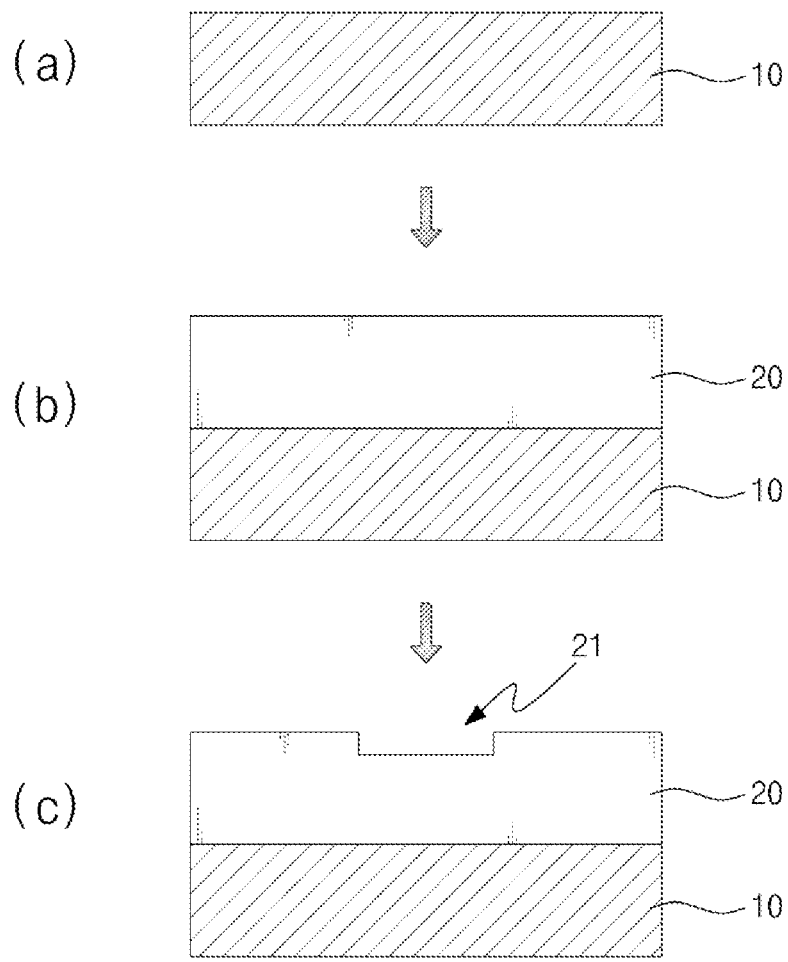
FIG. 7 is a view sequentially showing cross-section views of a part including silicon carbide layer manufactured according to another embodiment of the present disclosure in a case where a substrate does not have a groove.

FIGS. 5 to 7 sequentially illustrate cross-section views of the part including silicon carbide layer according to another embodiment of the present disclosure. Referring to those views, the method for manufacturing a part including silicon carbide layer manufactured according to another embodiment of the present disclosure will be described in detail as below.

First, as illustrated in (a) of FIG. 5, the graphite substrate 10 is prepared (S10). Here, in the graphite substrate, a groove 11 is formed, corresponding to a groove to be formed on a surface of the part including silicon carbide layer. Here, the groove may be an area where a part of the surface has been removed in order to make a concave part on the surface, or an area where a part of the surface has been removed excluding a part where a protrusion is to be formed in order to make a convex protrusion on the surface.

Next, a silicon carbide layer 20 is laminated on the surface of the graphite substrate where the groove 11 is formed (S20). Here, it is desirable that the thickness of the silicon carbide layer is laminated thickly such that the thickness of the silicon carbide layer is 0.01 to 1 times that of the graphite substrate.

Here, as described above, at an initial stage when depositing the silicon carbide layer, it is desirable to deposit the silicon carbide layer at the first deposition rate where the depositing temperature is not too high, and then after the silicon carbide is filled in the pores of the graphite substrate and covered the entirety of the upper surface of the graphite substrate (when there is no unexposed upper surface of the graphite substrate), it is desirable to increase the deposition rate of the silicon carbide layer to the second deposition rate and deposit the silicon carbide layer up to the desired thickness.

However, when the silicon carbide layer is laminated thinly, a groove of the same shape as the groove 11 formed on the surface of the graphite substrate is formed on the surface of the silicon carbide layer, but on the part including silicon carbide layer according the present disclosure, the silicon carbide layer is laminated, and thus as illustrated in (b) of FIG. 5, the groove on the surface of the silicon carbide layer may have a different shape from the groove 11 on the surface of the graphite substrate.

Therefore, in the method for manufacturing a part including silicon carbide layer according to another embodiment of the present disclosure, as illustrated in (c) of FIG. 5, the surface of the silicon carbide layer 20 is processed to form a groove 21 corresponding to the groove 11 of the graphite substrate, on the surface of the silicon carbide layer (S30).

Due to the groove 11 formed in advance on the graphite substrate 10, a concave part A is formed on the surface of the silicon carbide layer 20, and this concave part corresponds to the position of the groove 11, and thus by surface processing of trimming the concave part to have a width and depth corresponding to the groove 11, a groove 21 corresponding to the groove 11 of the surface of the graphite substrate may be formed on the surface of the silicon carbide layer 20.

Meanwhile, when the cross-sectional area of the groove 11 formed on the graphite substrate is small or when laminating the silicon carbide layer thickly, the width of the concave part A formed on the surface of the silicon carbide layer may become greater than the width of the groove 11 as illustrated in (b) of FIG. 6.

In such a case, it is not possible to form a groove 21 corresponding to the groove 11 of the surface of the graphite substrate, on the surface of the silicon carbide layer 20 by simply processing the surface of the silicon carbide layer.

In this case, through total processing of removing an entirety of the surface of the laminated silicon carbide layer 20 by a certain thickness such that the concave part A of the silicon carbide layer has a smaller cross-sectional area than the groove 11 of the surface of the graphite substrate as illustrated in (c) of FIG. 6, and partial processing of removing a partial area of the silicon carbide layer such that the concave part remaining after the total processing has a depth and cross-section corresponding to the groove 11 of the surface of the graphite substrate, the groove 21 corresponding to the groove 11 of the surface of the graphite substrate can be formed on the surface of the silicon carbide layer 20.

However, removing the entirety of the surface of the laminated silicon carbide layer by a certain thickness due to the concave part A having a greater cross-sectional area than the groove 11 of the surface of the graphite substrate is a cumbersome process, and thus when the silicon carbide layer must be laminated thickly by a certain thickness or more, or when the cross-sectional area of the groove to be formed on the surface is small and thus it is expected that the concave part A of the surface of the silicon carbide layer will be formed to have a greater cross-sectional area than the groove 11 of the surface of the graphite substrate, as illustrated in FIG. 7, a part having a groove formed on its surface can be manufactured even when using a graphite substrate that does not have a groove on the surface.

That is, as illustrated in FIG. 7, by preparing a graphite substrate 10 that does not have a groove on its surface, and laminating a silicon carbide layer on the surface of the graphite substrate, and then forming a groove having a desired depth and cross-section on the surface of the silicon carbide layer, a part having a groove formed on its surface can be manufactured.

Hereinabove, a part including silicon carbide layer and manufacturing method thereof according to an embodiment of the present disclosure was described with reference to specific embodiments. However, the present disclosure is not limited to such specific embodiments, and it should be understood that various changes and alternations can be made without departing from the spirit and field of the present disclosure claimed in the claims set.

What is claimed is:

1. A manufacturing method of a part including a silicon carbide layer, the method comprising:
   preparing a graphite substrate having a first groove formed on a surface of the graphite substrate;
   depositing the silicon carbide layer on the surface of the graphite substrate; and
   surface processing of removing at least partially a surface of the silicon carbide layer to form a second groove on the surface of the silicon carbide layer,
   wherein at the surface processing, the surface of the silicon carbide layer is processed such that the surface of the silicon carbide layer has the second groove having a position and shape corresponding to the first groove,
   wherein the surface processing comprises total processing of removing an entirety of the surface of the deposited silicon carbide layer by a certain thickness such that a concave part of the silicon carbide layer deposited on an upper portion of the first groove has a smaller cross-sectional area than the first groove; and
   partial processing of removing a partial area of the silicon carbide layer such that the concave part remaining after the total processing has a depth and cross-section corresponding to the first groove, to form the second groove.

2. The manufacturing method according to claim 1, wherein at the depositing the silicon carbide layer, the silicon carbide layer is deposited such that a thickness of the silicon carbide layer is 0.01 to 1 times a thickness of the graphite substrate, or such that the thickness of the silicon carbide layer is 2 mm to 3 mm.

3. The manufacturing method according to claim 1, wherein the depositing the silicon carbide layer involves depositing the silicon carbide layer at a first deposition rate until the silicon carbide layer covers an entirety of the surface of the graphite substrate and then depositing the silicon carbide layer at a second deposition rate that is faster than the first deposition rate.

4. The manufacturing method according to claim 3, wherein the first deposition rate is 5 µm/h or more and 10 µm/h or less, and the second deposition rate is 30 µm/h or more and 120 µm/h or less, or 50 µm/h or more and 100 µm/h or less.

* * * * *